(12) United States Patent
Suzuki

(10) Patent No.: US 6,947,658 B1
(45) Date of Patent: Sep. 20, 2005

(54) ELECTRONIC IMAGE FILING APPARATUS HAVING IMAGE NAMING FUNCTION

(75) Inventor: Takeshi Suzuki, Akiruno (JP)

(73) Assignee: Olympus Optical Co., Ltd., Tokyo (JP)

( * ) Notice: Subject to any disclaimer, the term of this patent is extended or adjusted under 35 U.S.C. 154(b) by 673 days.

(21) Appl. No.: 09/400,412

(22) Filed: Sep. 21, 1999

(30) Foreign Application Priority Data

Sep. 25, 1998 (JP) .......................................... 10-271355

(51) Int. Cl.[7] .............................................. H04N 5/91
(52) U.S. Cl. ................. 386/46; 386/1; 386/95
(58) Field of Search ................. 386/1, 46, 95; 707/1

(56) References Cited

U.S. PATENT DOCUMENTS

| | | | |
|---|---|---|---|
| 5,153,721 A | * | 10/1992 | Eino et al. .................. 382/152 |
| 5,179,649 A | * | 1/1993 | Masuzaki et al. ........... 382/177 |
| 5,335,072 A | * | 8/1994 | Tanaka et al. .............. 348/232 |
| 5,515,101 A | * | 5/1996 | Yoshida ....................... 386/95 |
| 5,719,987 A | * | 2/1998 | Kawamura et al. ......... 386/120 |
| 6,249,644 B1 | * | 6/2001 | Inoue et al. ................ 386/130 |

FOREIGN PATENT DOCUMENTS

| | | |
|---|---|---|
| JP | 06-237410 | 8/1994 |
| JP | 09-205606 | 8/1997 |

OTHER PUBLICATIONS

Office Action dated Apr. 3, 2001 issued in counterpart Japanese Patent Application No. 270293/99, and English translation thereof.

* cited by examiner

Primary Examiner—James Fletcher
(74) Attorney, Agent, or Firm—Frishauf, Holtz, Goodman & Chick, P.C.

(57) ABSTRACT

An electronic album according to the present invention includes an image data selecting section for selecting image data to be titled, a picture-taking information capturing section for capturing a plurality of picture-taking information items about the image data selected by the image data selecting section, and a picture-taking information interpreting section for performing a logical operation for the picture-taking information items captured by the picture-taking information capturing section to interpret all contents of the picture-taking information items and predict what type of scene corresponds to the image data.

3 Claims, 5 Drawing Sheets

FIG. 6

| W.B. | PICTURE-TAKING INFORMATION ||||||| PREDICTION SCENE |
| | FO | ZO | ST | SH | DP | DATE | |
| --- | --- | --- | --- | --- | --- | --- | --- |
| ... | DISTANT VIEW | ... | ... | ... | ... | ... | LANDSCAPE |
| ... | 1m to 2m | ... | ... | ... | ... | ... | PORTRAIT |
| ... | ≤ 1m | ... | ... | ... | ... | ... | CLOSE-UP |
| FLUORESCENT LAMP (INDOORS) | ... | ... | ... | ... | ... | ... | INDOORS |
| ... | 1m to 2m | ... | STROBE | SLOW | ... | ... | NIGHT PORTRAIT |
| ... | 1m to 2m | ... | STROBE | QUICK | ... | ... | DAY PORTRAIT |
| SUNNY (OUTDOORS) | 2m to 4m | ... | NONE | QUICK | OPEN | OCTOBER | SPORTS |
| ... | DISTANT VIEW | ... | NONE | VERY SLOW | OPEN | ... | NIGHT VIEW & ASTROPHOTO |
| MICROSCOPE LIGHTING | ... | ... | NONE | ... | ... | ... | PHOTOMICROGRAPHY |
| ... | 2m to 4m | WIDE | ... | ... | ... | ... | GROUP PHOTO |
| ... | ... | ... | ... | ... | ... | JANUARY | NEW YEAR PHOTO |
| ... | ... | ... | ... | ... | ... | SUNDAY | LEISURE |

ELECTRONIC IMAGE FILING APPARATUS HAVING IMAGE NAMING FUNCTION

BACKGROUND OF THE INVENTION

The present invention relates to an electronic album in which data containing images and characters (still images, moving images, voice, text, etc.), which are picked up by an electronic camera or the like, can be stored together in a recording medium, such as a memory card and a magnetic disk, and then reproduced and displayed at any time.

It is required that an appropriate title be added to each item of image data stored in an electronic album. The reason is as follows. When a number of image data items stored in the electronic album are sorted, processed and the like, if they have no titles, they cannot be quickly distinguished from one another. Such sorting therefore gives an operator a lot of trouble.

A conventional operation for titling each image data is carried out by the following procedures. First one image data to be titled is selected. Then the selected image data is supplied and displayed on a display device as an image. The contents of the displayed image are grasped by an operator (e.g., a user) and a title suitable for the contents is determined by the operator. The determined title is input by a keyboard or the like and added to the image data.

In the above conventional titling operation, a title, which is to be added to each image data item, is considered and determined by the operator. The determined title is input by the operator using the keyboard. It is thus very complicated and inefficient to perform the titling operation and it is difficult to title image data appropriately.

BRIEF SUMMARY OF THE INVENTION

The object of the present invention is to provide an electronic album having a titling function capable of exactly adding an appropriate title to specific image data by a simple operation.

To attain the above object, the electronic album according to the present invention has the following feature in configuration. The other features will be clarified in the Description of the Invention.

An electronic album according to the present invention comprises an image data selecting section for selecting image data to be titled, a picture-taking information capturing section for capturing a plurality of picture-taking information items about the image data selected by the image data selecting section, and a picture-taking information interpreting section for performing a logical operation for the picture-taking information items captured by the picture-taking information capturing section to interpret all contents of the picture-taking information items and predict what type of scene corresponds to the image data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a table showing picture-taking information and predictions based thereon.

DETAILED DESCRIPTION OF THE INVENTION (First Embodiment)

Figure 1:
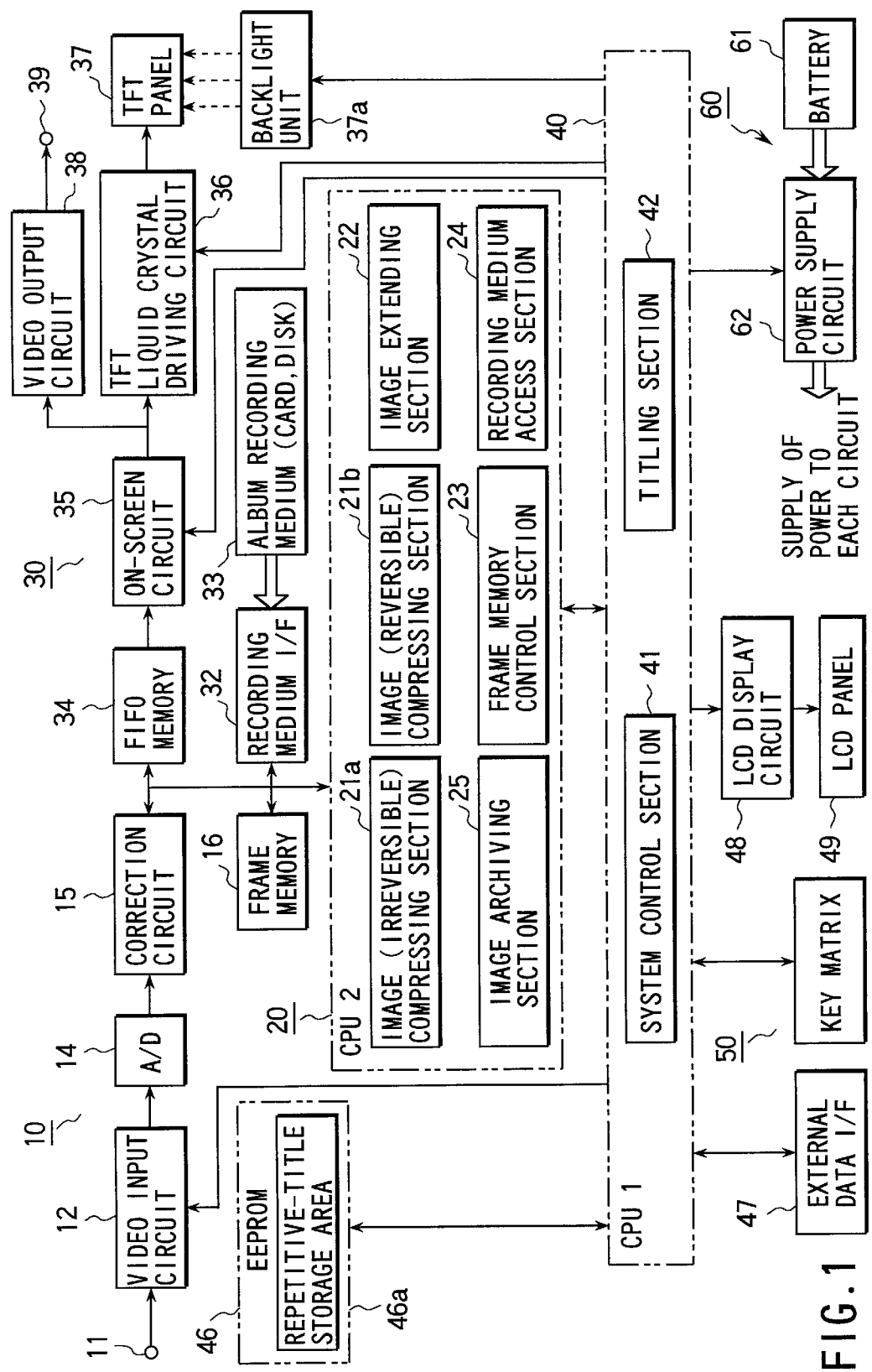
FIG. 1 is a block diagram illustrating a configuration of an electronic album according to a first embodiment of the present invention.

FIG. 1 shows an electronic album according to a first embodiment of the present invention. The electronic album is constituted chiefly of an image input section 10, an image data processing section 20, an image data recording/display section 30, a control section 40, an operating section 50, and a power supply section 60.

The image input section 10 includes a video input terminal 11, a video input circuit 12, an A/D conversion circuit 14, a correction circuit 15, and a frame memory 16. Image data is input to the video input circuit 12 from the video input terminal 11 and converted to a digital signal by the A/D conversion circuit 14. The digital signal is then brought into white balance and gamma-corrected by the correction circuit 15, thereby storing images into the frame memory 16 one by one.

The image data processing section 20 is constituted of a CPU 2 including an image (irreversible) compressing section 21a, an image (reversible) compressing section 21b, an image extending section 22, a frame memory control section 23, a recording medium access section 24, and an image archiving section 25.

The "archiving" is a function of collecting a plurality of image data items, which are stored in different files, in a single file and thus effectively using an unused recording area of each of the files thereby to compress all the data items again.

In the image data processing section 20, the images stored in the frame memory 16 are compressed one by one and then stored in an album recording medium 33 of the image data recording/display section 30. Furthermore, the section 20 extends the image data stored in the recording medium 33 and sends it to an FIFO memory 34 of the section 30, and gains access to the recording medium 33.

The image data recording/display section 30 includes a recording medium I/F 32, an album recording medium (card medium, disk medium, etc.) 33, a display FIFO memory 34, an on-screen circuit 35, a TFT liquid crystal driving circuit 36, a TFT panel 37, a TFT panel illuminating backlight unit 37a, a video output circuit 38, and video output terminal 39. The section 30 therefore records image data stored in the frame memory 16 in the album recording medium 33, and reads image data out of the medium 33 and sends it to a display system for display.

The image data sent to the display system is stored temporarily in the display FIFO memory 34, then read out therefrom and converted to a video signal in the on-screen circuit 35. A title and the other characters are added to the video signal in response to a control signal from the control section 40 (described later). On one hand, the title-added video signal is supplied to the TFT panel 37 through the TFT liquid crystal driving circuit 36, and the panel 37 is illuminated by the backlight unit 37a to display the video signal as a subject image. On the other hand, the video signal is output from the video output terminal 39 via the video output circuit 38.

The control section 40 is constituted chiefly of a CPU 1 including a system control section 41 and a titling section 42. The control section 40 is provided with an EEPROM 46 for storing initializing information of the electronic album. In the first embodiment, the EEPROM 46 has a repetitive-title storage area 46a for storing repetitive-title information, and repetitive titles, which are to be added to image data items, are stored in this area 46a.

The control section 40 thus controls the overall system including the image input section 10, image data processing section 20 and image data recording/display section 30 using the system control section 41, and has a function of adding a specific title to image data to be displayed by transmitting a control signal to the on-screen circuit 35.

Figure 2:
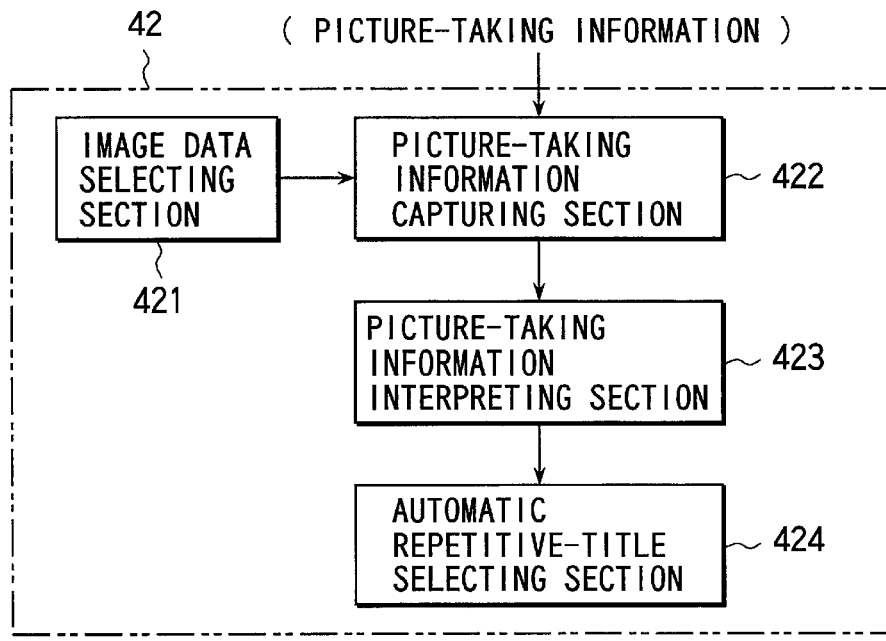
FIG. 2 is a block diagram showing a configuration of a titling section of the electronic album illustrated in FIG. 1.

The titling section 42 is constituted as shown in FIG. 2 and includes an image data selecting section 421 for selecting one image data item to be titled, picture-taking information capturing section 422 for capturing a plurality of picture-taking information items (white-balance information, focus information, etc.) about one image data item selected by the image data selecting section 421, a picture-taking information interpreting section 423 for performing a logical operation for the picture-taking information items captured by the section 422 to interpret all the contents of the picture-taking information items and predict what type of scene corresponds to the image data, and an automatic repetitive-title selecting section 424 for automatically selecting a plurality of repetitive titles corresponding to the type of scene predicted by the section 423 as the optimum title.

The picture-taking information interpreting section 423 comprises, e.g., a logical operation circuit, and is designed to interpret all of the picture-taking information items about image data items as indicated in FIG. 6. Based on a result of the interpretation, the section 423 predicts what type of scene corresponds to each of the image data items.

Assume that the picture-taking information items regarding certain image data include the following:
W.B.(white balance) Information: Sunny, Outdoors
FO (focus) Information: 2 m to 4 m
ZO (zoom) Information: . . .
ST (strobe) Information: None
SH (shutter speed) information: Quick
DP (diaphragm) information: Open
Picture-Taking Date Information: October In the above case, the section 423 interprets all the information items and predicts that the image data item represents a "sports photograph." The W.B (white balance) information represents color temperature regarding a field of view and, as shown in FIG. 6, a fluorescent lamp (indoors), sunny weather (outdoors), etc., are predicted from the W.B information.

The automatic repetitive-title selecting section 424 selects, as the optimum title candidates, a plurality of repetitive titles, such as "EXCURSION," "ATHLETIC MEET," "SWIMMING MEET," and "BALL GAME," from among those stored in advance in the EEPROM 46, based on a type of scene predicted by the picture-taking information interpreting section 423.

The control section 40 is provided with an external data I/F 47 for exchanging data with a personal computer and the like, an LCD circuit 48 for operating an LCD panel 49 for display, and an operating section 50.

The LCD panel 49 displays the plurality of repetitive titles selected by the automatic repetitive-title selecting section 424 as the optimum title candidates.

The operating section 50 is constituted chiefly of a key matrix for performing a switching operation for operating the electronic album.

The power supply section 60 employs a battery 61 (e.g., four batteries of 1.5 V) as a main power supply to supply power of a given voltage to the respective circuits described above through a power supply circuit 62.

Figure 3:
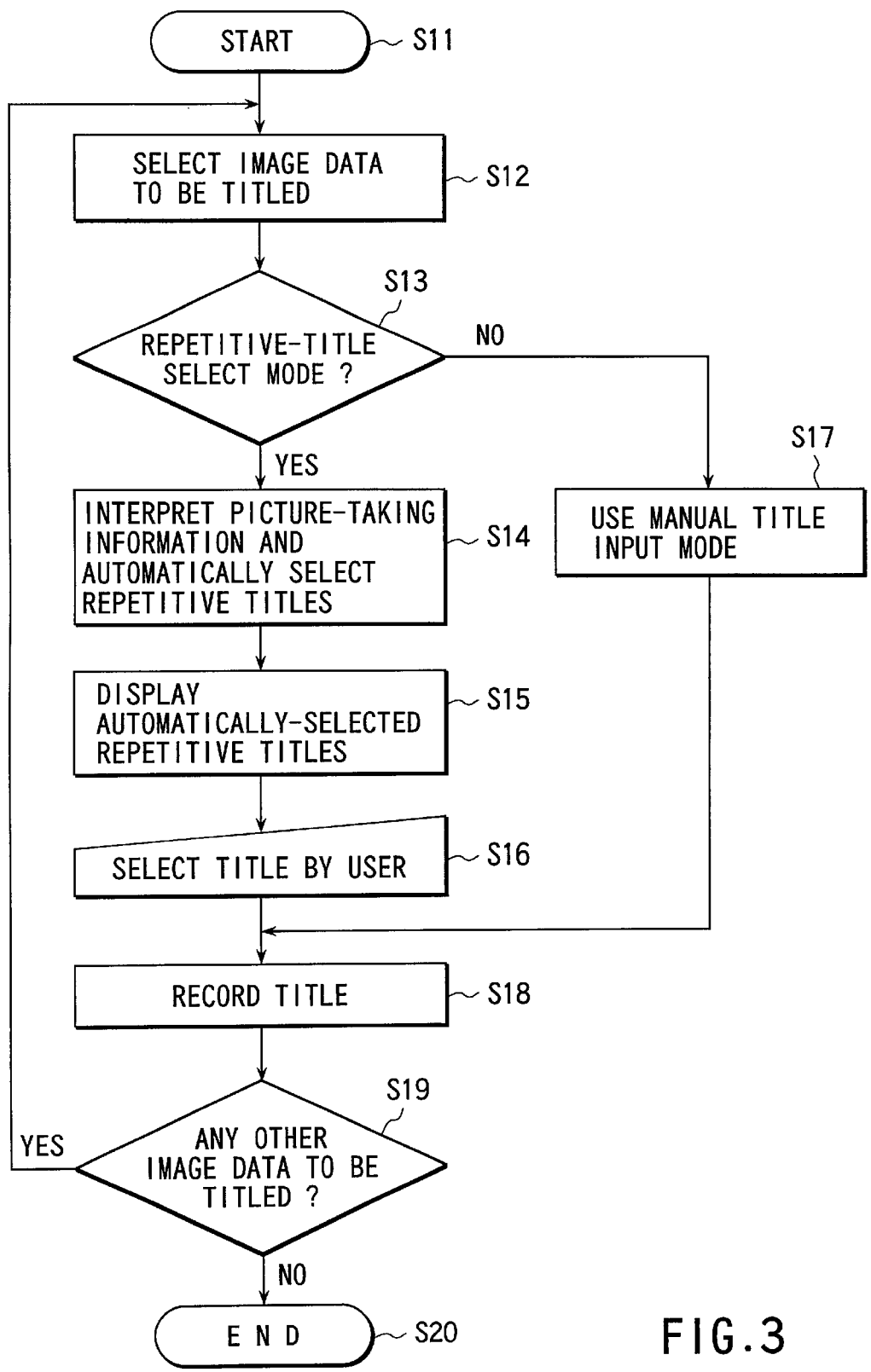
FIG. 3 is a flowchart showing a process of titling image data stored in the electronic album illustrated in FIG. 1.

Referring to the flowchart shown in FIG. 3, a process of titling image data will now be described.
[Step S11]
A titling operation starts.
[Step S12]
Image data to be titled is selected.
[Step S13]
It is determined whether a repetitive title select mode is set. If YES (the mode is set), the flow advances to step S14. If NO (the mode is not set), it goes to step S17.
[Step S14]
The picture-taking information interpreting section 423 interprets a plurality of picture-taking information items about the selected image data and predicts a type of scene. Based on the predicted type of scene, a plurality of repetitive titles are automatically selected, as the optimum title candidates, from among the repetitive titles stored in the EEPROM 46.
[Step S15]
The automatically-selected repetitive titles are displayed on the LCD panel 49.
[Step S16]
The optimum one of the displayed repetitive titles is selected by an operator (e.g., a user).
[Step S17]
If it is determined in step S13 that the repetitive title select mode is not set, the titling operation is performed in a manual title input mode.
[Step S18]
The selected title is recorded by key operation of the operating section 50.
[Step S19]
It is determined whether there is other image data to be titled. If YES, the flow returns to step S12. If NO, it advances to step S20.
[Step S20]
The titling operation ends.
(Second Embodiment)

Figure 4:
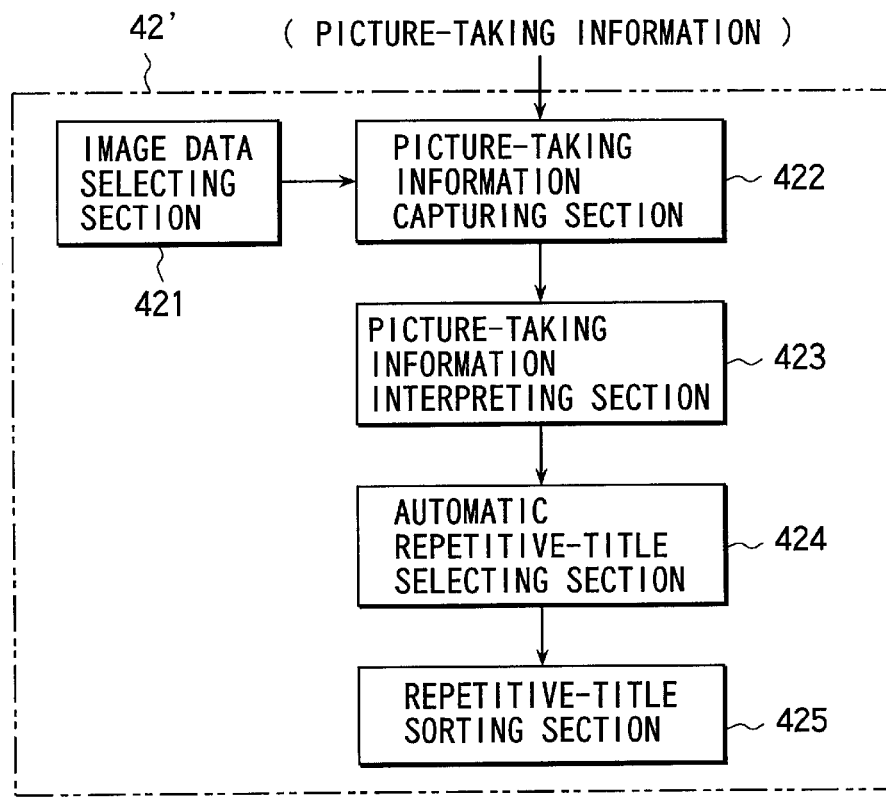
FIG. 4 is a block diagram showing a configuration of a titling section of an electronic album according to a second embodiment of the present invention.

FIG. 4 is a block diagram showing a configuration of a titling section 42' of an electronic album according to a second embodiment of the present invention. The titling section 42', of the second embodiment differs from that (42) of the first embodiment in that it includes a repetitive-title sorting section 425.

The section 425 is constituted of a logical operation circuit and designed to sort a plurality of repetitive titles, which are automatically selected by an automatic repetitive-title selecting section 424, in order of selection preference of the optimum title. A specific example thereof is as follows.

Assume that as described above, a plurality of repetitive titles, such as "EXCURSION," "ATHLETIC MEET," "SWIMMING MEET," and "BALL GAME," are selected as the optimum title candidates. Since, of the picture-taking information items, the SH (shutter speed) information is "Quick" and the picture-taking-date information is "October," it is determined that the order of selection preference of the optimum title is "ATHLETIC MEET," "BALL GAME," "EXCURSION," and "SWIMMING MEET" and these titles are sorted in this order. Thus, the optimum title can be selected very easily by a user or an operator.

Except for the above, the second embodiment is the same as the first embodiment and its detailed descriptions are omitted.

Figure 5:
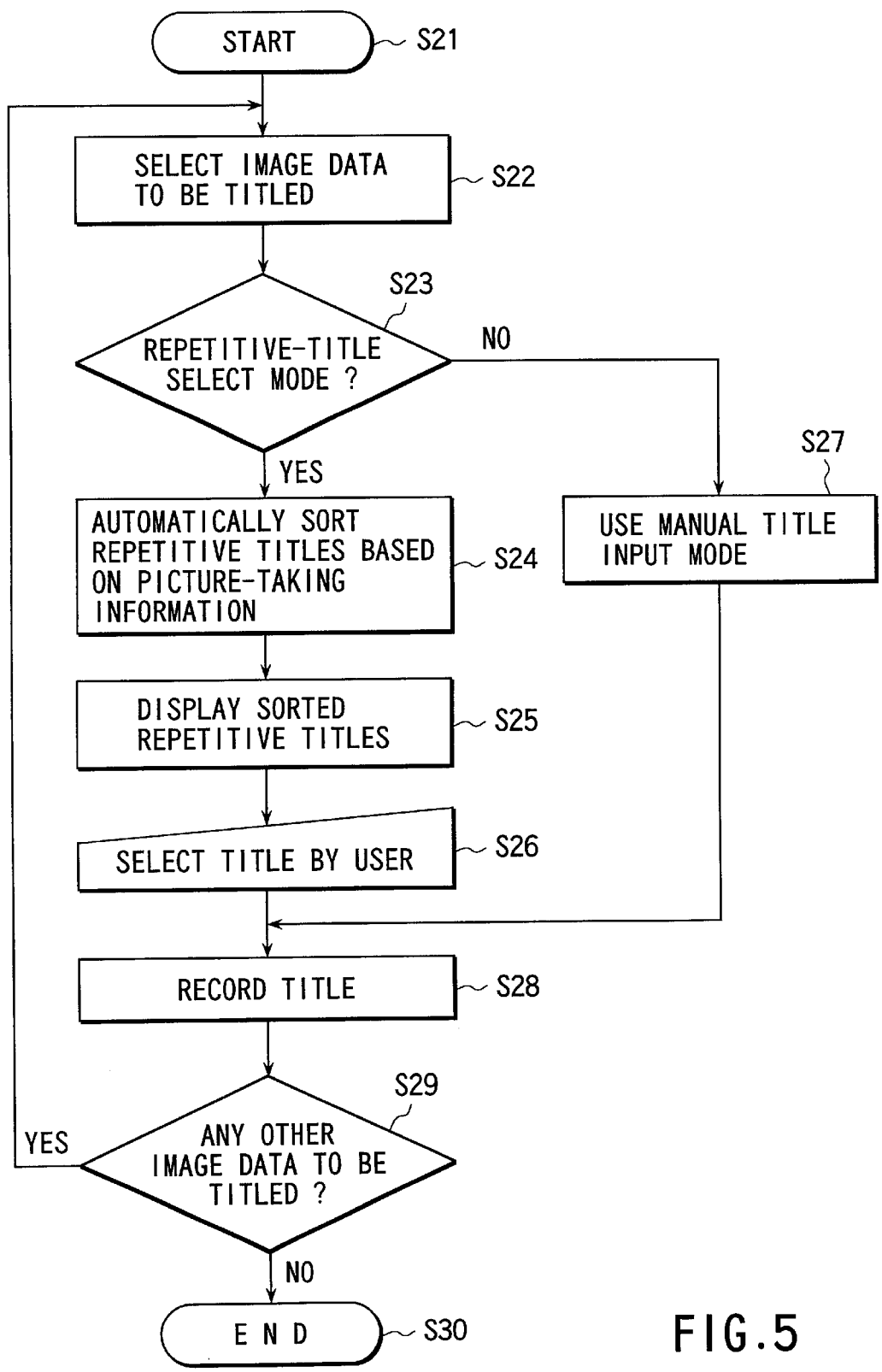
FIG. 5 is a flowchart showing a process of titling image data stored in the electronic album according to the second embodiment of the present invention.

Referring to the flowchart shown in FIG. 5, a process of titling image data, including a step of sorting repetitive titles, in the second embodiment, will now be described.

[Step S21]
A titling operation starts.
[Step S22]
Image data to be titled is selected.
[Step S23]
It is determined whether a repetitive title select mode is set. If YES, the flow advances to step S24. If NO, it goes to step S27.
[Step S24]
The picture-taking information interpreting section 423 interprets all of picture-taking information items about the selected image data. Based on a result of the interpretation, a plurality of repetitive titles are automatically selected, as the optimum title candidates, from among the repetitive titles stored in the EEPROM 46. The automatically-selected repetitive titles are then sorted in order of selection preference of the optimum title by the repetitive-title sorting section 425.
[Step S25]
The sorted repetitive titles are displayed on the LCD panel 49.
[Step S26]
The optimum one of the displayed repetitive titles is selected by an operator (e.g., a user).
[Step S27]
If it is determined in step S23 that the repetitive title select mode is not set, the titling operation is performed in a manual title input mode.
[Step S28]
The selected title is recorded.
[Step S29]
It is determined whether there is other image data to be titled. If YES, the flow returns to step S22. If NO, it advances to step S30.
[Step S30]
The titling operation ends.

(Features of the Embodiments)

[1] An electronic album according to the above embodiment comprises an image data selecting section (421) for selecting image data to be titled, a picture-taking information capturing section (422) for capturing a plurality of picture-taking information items (W.B.-information, focus information, etc.) about the image data selected by the image data selecting section (421), and a picture-taking information interpreting section (423) for performing a logical operation for the picture-taking information items captured by the picture-taking information capturing section (422) to interpret all contents of the picture-taking information items and predict what type of scene corresponds to the image data.

In the electronic album described above, a logical operation for the picture-taking information items captured by the picture-taking information capturing section (422), is performed by the picture-taking information interpreting section (423) and thus a type of scene corresponding to image data to be titled is predicted automatically. For this reason, the title to be added to the image data can be selected quickly and exactly from within a limited range.

[2] The electronic album as described in above item [1], further comprises an automatic repetitive-title selecting section (424) for automatically selecting a plurality of repetitive titles, which correspond to the type of scene predicted by the picture-taking information interpreting section (423), as optimum title candidates, and a selecting and an adding section (40, 49, 50, 35) for selecting an optimum title from among the repetitive titles automatically selected by the automatic repetitive-title selecting section (424) and adding the optimum title to the image data.

In the foregoing electronic album, a plurality of repetitive titles, which correspond to the type of scene predicted based on the picture-taking information items (W.B. information, focus information, etc.), are automatically selected as alternatives. If, for example, the W.B. information indicates outdoors and thus the scene is predicted as sports, the repetitive titles such as "EXCURSION" and "ATHLETIC MEET" are selected automatically. Therefore, a user can easily select the optimum one, e.g., "EXCURSION" from among them.

[3] The electronic album as described in above item [2], further comprises a repetitive-title sorting section (425) for sorting the plurality of repetitive titles automatically selected by the automatic repetitive-title selecting section (424) in order of selection preference of an optimum title, based on the picture-taking information items (W.B. information, focus information, etc.).

In the foregoing electronic album, the order of the plurality of repetitive titles, which are automatically selected by the automatic repetitive-title selecting section 424 and then displayed as alternatives, is automatically changed to that of selection preference of the optimum title. In the case of the above sports photography, the SH (shutter speed) information is "Quick" and the picture-taking-date information is "October" and thus the repetitive titles are sorted in the following order, "ATHLETIC MEET," "BALL GAME," "EXCURSION" and "SWIMMING MEET." Thus, a user can finally select "ATHLETIC MEET" as the best title quickly and exactly.

(Modifications)

In the foregoing embodiments, the electronic album is provided independently of an electronic camera and designed to store data including image data and character data together in a recording medium exclusively for the electronic album. However, the electronic album can be built in an electronic camera and, in this case, the recording medium is provided removably from the electronic camera.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic image filing apparatus having an image naming function, said electronic image filing apparatus comprising:

an image data selecting section for selecting image data to be titled;

a picture-taking information capturing section for capturing different types of picture-taking information items about the image data selected by the image data selecting section; and a picture-taking information interpreting section for performing a logical operation on the picture-taking information items captured by the picture-taking information capturing section to interpret contents of the picture-taking information items and predict a type of scene which corresponds to the image data selected by the image data selecting section.

2. The electronic image filing apparatus according to claim 1, further comprising:

an automatic repetitive-title selecting section for automatically selecting a plurality of repetitive titles which correspond to the type of scene predicted by the picture-taking information interpreting section, as optimum title candidates; and a selecting and adding section for selecting an optimum title from among the repetitive titles automatically selected by the automatic repetitive-title selecting section and adding the optimum title to the image data selected by the image data selecting section.

3. The electronic image filing apparatus according to claim 2, further comprising a repetitive-title sorting section for sorting the plurality of repetitive titles automatically selected by the automatic repetitive-title selecting section in order of selection preference, based on the different types of picture-taking information items captured by the picture-taking information capturing section.

* * * * *